(12) United States Patent
Avramidis et al.

(10) Patent No.: US 11,891,519 B2
(45) Date of Patent: Feb. 6, 2024

(54) ASPHALT COMPOSITION AND METHOD OF USING SAME IN TACK COATS

(71) Applicant: BASF SE, Ludwigshafen am Rhein (DE)

(72) Inventors: Kostas S. Avramidis, Charlotte, NC (US); James T. Andrews, Charlotte, NC (US); William J. Kirk, Charlotte, NC (US); Kimberly L. Walden, Charlotte, NC (US); Arlis A. Kadrmas, Charlotte, NC (US)

(73) Assignee: BASF SE, Ludwigshafen am Rhein (DE)

( * ) Notice: Subject to any disclaimer, the term of this patent is extended or adjusted under 35 U.S.C. 154(b) by 799 days.

(21) Appl. No.: 17/042,215

(22) PCT Filed: Jan. 28, 2019

(86) PCT No.: PCT/US2019/015374
§ 371 (c)(1),
(2) Date: Sep. 28, 2020

(87) PCT Pub. No.: WO2019/190624
PCT Pub. Date: Oct. 3, 2019

(65) Prior Publication Data
US 2021/0017388 A1  Jan. 21, 2021

Related U.S. Application Data

(60) Provisional application No. 62/648,639, filed on Mar. 27, 2018.

(51) Int. Cl.
*C08L 95/00* (2006.01)
*C08L 9/06* (2006.01)
*C08L 25/10* (2006.01)

(52) U.S. Cl.
CPC .............. *C08L 95/005* (2013.01); *C08L 9/06* (2013.01); *C08L 25/10* (2013.01); *C08L 2555/22* (2013.01); *C08L 2555/28* (2013.01); *C08L 2555/84* (2013.01)

(58) Field of Classification Search
None
See application file for complete search history.

(56) References Cited

U.S. PATENT DOCUMENTS

| | | |
|---|---|---|
| 6,811,601 B2 | 11/2004 | Borzyk et al. |
| 7,268,199 B2 | 9/2007 | Andre et al. |
| 7,736,525 B2 | 6/2010 | Thankachan et al. |
| 8,193,144 B2 | 6/2012 | Tanner et al. |
| 8,952,092 B2 | 2/2015 | Avramidis et al. |
| 11,746,297 B2 * | 9/2023 | Abbott ................... C10G 57/02 585/241 |

FOREIGN PATENT DOCUMENTS

| | | | |
|---|---|---|---|
| CN | 107652414 A | 2/2018 | |
| CN | 112552443 B * | 9/2022 | ............ C08F 212/08 |
| DE | 102020003875 A1 * | 12/2021 | |
| EP | 209831 A2 | 1/1987 | |
| JP | 3992492 B2 * | 10/2007 | |
| JP | 4094341 B2 * | 6/2008 | |
| KR | 20100138290 A | 12/2010 | |
| WO | WO-9967352 A1 | 12/1999 | |
| WO | WO-2013115825 A1 | 8/2013 | |
| WO | WO-2016209692 A1 | 12/2016 | |
| WO | WO-2019190624 A1 * | 10/2019 | .............. C08L 25/10 |
| WO | WO-2021225574 A1 * | 11/2021 | ............. C08G 18/12 |

OTHER PUBLICATIONS

International Search Report for PCT/US2019/015374 dated Apr. 23, 2019.
Written Opinion of the International Searching Authority for PCT/US2019/015374 dated Apr. 23, 2019.
International Preliminary Report on Patentability received for PCT Patent Application No. PCT/US2019/015374, dated Oct. 8, 2020, 10 pages.

\* cited by examiner

*Primary Examiner* — Sanza L. McClendon
(74) *Attorney, Agent, or Firm* — Faegre Drinker Biddle & Reath LLP

(57) ABSTRACT

Provided herein are asphalt compositions comprising asphalt, a carboxylated copolymer, a polyalkyleneimine, and a photoinitiator. The carboxylated copolymer present in the asphalt compositions can be a latex composition derived from a carboxylated styrene-butadiene copolymer. The carboxylated copolymer includes from 0.5% to 25% by weight carboxylic acid monomers. The carboxylated styrene-butadiene polymer and the asphalt can be present in a weight ratio of from 1:99 to 1:10. The polyalkyleneimine present in the asphalt compositions can be in an amount of greater than 0% to up to 10% by weight of the asphalt composition. The photoinitiator can include benzophenone and/or a derivative thereof. Tack coats meeting ASTM-D-977 standard comprising the asphalt compositions disclosed herein are also provided. The tack coat can have a tack-free time of 10 minutes or less. Methods of producing the asphalt compositions and tack coats are also disclosed.

3 Claims, No Drawings

ASPHALT COMPOSITION AND METHOD OF USING SAME IN TACK COATS

CROSS-REFERENCE TO RELATED APPLICATIONS

This application is a national stage application (under 35 U.S.C. § 371) of PCT/US2019/015374, filed Jan. 28, 2019, which claims the benefit of U.S. Provisional Application No. 62/648,639 filed Mar. 27, 2018, the disclosure of both of which are hereby incorporated by reference in their entirety.

FIELD OF THE DISCLOSURE

The present disclosure relates to asphalt compositions, particularly to asphalt compositions for use in trackless coatings.

BACKGROUND

A tack or bond coat is a thin layer of a hot mix asphalt, an asphalt emulsion or cutback (asphalt combined with a solvent) that is applied between pavement layers to promote bonding between layers. Typically, the tack coat bonds an existing asphalt surface to a newly applied asphalt layer. It is important to achieve good bonding between the tack coat and the asphalt layers so the resulting composite responds as a single unit to external traffic and environmental stresses. If adjacent asphalt layers do no bond together, they will each respond differently to the imposed external stresses and will deform at different rates. As a result, bonding between asphalt layers diminishes resulting in delamination or debonding of the asphalt layers. This debonding is followed by cracking, potholes and other defects such as rutting that limit the pavement service life. Needless to say, these pavement failures may cause dangerous traffic conditions and could require extensive and costly repairs.

A tack coat should be tacky enough to be able to bond the asphalt layers. However, after application of the tack coat to the existing road surface, construction vehicles such as those carrying the new asphalt pavement to be applied to the tack coat, are expected to be able to travel over the tack coat surface without tracking, i.e., without having the tack coat adhere or get picked-up by the vehicle tires. If the tack coat adheres to the vehicle tires, the tack coat will be removed from the pavement along the wheel-path direction, essentially reducing the amount of tack coat available for bonding of the asphalt layers. A loss of tack coat results in insufficient adhesion between a new layer of pavement and the existing pavement resulting in premature deterioration of the pavement structure, such as pavement separation and cracking. These defects will require costly repairs, can cause damage to vehicles, and may jeopardize the safety of the vehicle passengers. In addition, the picked-up tack coat will be tracked onto other pavement surfaces in the vicinity of the construction site causing disruption to the surrounding area. In order to provide adequate bonding, tack coats must be soft enough to provide a film that adheres to both the existing pavement and the new asphalt layer and yet hard enough to avoid tracking and tire pick-up by the construction vehicular traffic. Most asphalt tack coat compositions, however, do not provide adequate tracking resistance. If they do, it is only after significant time has elapsed since the application of the tack coat, which results in significant delays in pavement construction and project costs.

There is a need for asphalt tack coats to become trackless as quickly as possible after they are applied such that the new asphalt layer can be applied as quickly as possible following application of the tack coat on the old pavement. These tack coats would be of particular value for use on even non-asphalt structures such as concrete, tile, or brick surfaces. The compositions and methods described herein address these and other needs.

SUMMARY OF THE DISCLOSURE

Provided herein are asphalt compositions comprising asphalt, a carboxylated copolymer, a polyalkyleneimine, and optionally, a photoinitiator. The compositions disclosed herein are applicable to various types of asphalts, including asphalts softer than PG 64-22. For example, asphalts useful in the compositions disclosed herein can have a high temperature true performance grade of 45° C. or greater, such as 48° C. or greater, 50° C. or greater, 52° C. or greater or 58° C. or greater, as determined by AASHTO test TP5. In some examples, the asphalts can have a low temperature true performance grade of −10° C. or less, such as −15° C. or less, or −20° C. or less, −25° C. or less, −28° C. or less, −30° C. or less, −32° C. or less, −34° C. or less, −35° C. or less, or −40° C. or less, as determined by AASHTO test TP5. The asphalt can be present in an amount of from 50% to 99.9% by weight, based on the weight of the asphalt composition.

The carboxylated copolymer present in the asphalt compositions can be a latex composition derived from one or more carboxylic acid monomers and one or more ethylenically unsaturated monomers selected from the group consisting of styrene, butadiene, meth(acrylate) monomers, vinyl acetate, vinyl ester monomers including vinyl acrylics, and combinations thereof. In some examples, the carboxylated copolymer comprises styrene and butadiene. For example, the copolymer can be a carboxylated styrene-butadiene copolymer. The weight ratio of styrene to butadiene in the carboxylated copolymer can be from 5:95 to 95:5, such as from 20:80 to 80:20. The carboxylated copolymer can comprise from 40% to 99.5%, from 50% to 98%, or from 60% to 97% by weight styrene and butadiene monomers.

The carboxylated copolymer is further derived from carboxylic acid monomers. The carboxylated copolymer can comprise from 0.5% to 25%, from 0.5% to 10%, or from 0.5% to 5% by weight carboxylic acid monomers. The carboxylic acid monomers are selected from itaconic acid, fumaric acid, acrylic acid, methacrylic acid, crotonic acid, and combinations thereof, and preferably include itaconic acid. The carboxylated copolymer can have a glass transition temperature of from −90° C. to less than 110° C., preferably from −60° C. to less than 100° C., from −30° C. to less than 100° C., more preferably from −30° C. to 35° C. In some examples, the glass transition temperature of the carboxylated polymer is from −30° C. to 10° C.

When the copolymer is derived from a carboxylated styrene-butadiene copolymer, the copolymer and the asphalt can be present in a weight ratio of from 1:99 to 1:10.

As described herein, the asphalt compositions further include a polyalkyleneimine. The polyalkyleneimine can have a ratio of nitrogen to carbon of from 1:2 to 1:4. In some embodiments, the polyalkyleneimine has a degree of nitrogen-derivatization of at least 10%, such as from 30% to 90% or from 70% to 90%. The molecular weight of the polyalkyleneimine can be 2,000 KDa or less, preferably from 50 KDa to 2,000 KDa, more preferably from 50 KDa to 250 KDa. In some embodiments, the polyalkyleneimine is selected from a polyalkyleneimine, an alkylated polyalkyleneimine, an alkoxylated polyalkylenimine, or a combination thereof. For example, the polyalkyleneimine can be selected from a polyethyleneimine, an alkoxylated polyethyleneimine, an alkylated polyethyleneimine, or a combination thereof. Representative examples of the polyalkyleneimine include polyethyleneimine alkoxylated with one or more of propylene oxide, ethylene oxide, and butylene oxide. The polyalkyleneimine can be present in an amount of greater than 0% to up to 10%, from 0.1 wt % to 5 wt %, or from 0.5 wt % to 5 wt % by weight, based on the weight of the asphalt composition.

As described herein, the asphalt compositions can further include a photoinitiator. The photoinitiator can include benzophenone and/or a derivative thereof.

The asphalt composition can further comprise one or more of an aggregate, water, and a solvent other than water, such as a rejuvenating agent.

Methods of producing the asphalt compositions are also disclosed. The method can include blending a polyalkyleneimine and a carboxylated copolymer as described herein, at a pH of greater than 8 to form a blend; and mixing the blend with asphalt to produce the asphalt composition. The method can further include adding a pH modifying agent selected from ammonia, a lower alkylamine, or an amino alcohol, or a combination thereof, to provide the pH of greater than 8, such as greater than 9, or greater than 10. The pH modifying agent can be added before or after blending the polyalkyleneimine and a carboxylated copolymer. The method can include the step of adding a photoinitiator such as benzophenone, or a derivative thereof. Other methods of producing the asphalt compositions can include blending a polyalkyleneimine and an asphalt emulsion to form an asphalt emulsion blend at a pH greater than 8; and mixing a photoinitiator with the asphalt blend; and mixing the asphalt blend with a carboxylated copolymer as described herein, to produce the asphalt composition. In the methods of producing the asphalt compositions, the photoinitiator can be added to the polyalkyleneimine and the asphalt emulsion to form the asphalt blend or the photoinitiator can be added to the carboxylated copolymer prior to mixing with the asphalt blend.

In some embodiments, the asphalt is an unmodified asphalt. In other embodiments, the asphalt can include an asphalt emulsion. In some examples, the asphalt emulsion is anionic. In other examples, the asphalt emulsion is cationic. The method of producing the asphalt compositions can include decreasing the pH of the asphalt composition, such as to less than 8, less than 7, or less than 6 after mixing the blend with the asphalt emulsion to facilitate crosslinking of the carboxylated groups in the copolymer with the polyalkyleneamine.

Tack coats, meeting ASTM-D-977 standard, for bonding asphalt layers and comprising the asphalt compositions disclosed herein are also provided. The tack coats can include asphalt, a carboxylated styrene-butadiene copolymer, a polyalkyleneimine, and a benzophenone-containing photoinitiator. The tack coat can have a tack-free time of 10 minutes or less.

Methods for applying tack coats comprising the asphalt compositions are also disclosed. The method can include applying the tack coat to a surface, wherein the tack coat is at a temperature of from ambient temperature to 130° C., such as from 20° C. to 130° C., from 60° C. to 130° C., or from ambient temperature to 100° C. The applying step can be carried out using a brush, a squeegee, or a spray equipment. The surface can be selected from dirt, gravel, slurry seal pavement, chip seal pavement, hot mix asphalt, warm mix asphalt, microsurfaced pavements, and concrete pavements. The methods disclosed herein can further include applying an asphalt composition to the tack coat once the tack coat has become trackless.

The details of one or more embodiments are set forth in the description below. Other features, objects, and advantages will be apparent from the description and from the claims.

DETAILED DESCRIPTION

As used herein, "(meth)acryl . . . " includes acryl . . . and methacryl . . . and also includes diacryl . . . , dimethacryl . . . and polyacryl . . . and polymethacryl . . . . For example, the term "(meth)acrylate monomer" includes acrylate and methacrylate monomers, diacrylate and dimethacrylate monomers, and other polyacrylate and polymethacrylate monomers.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise. The disclosure of percentage ranges and other ranges herein includes the disclosure of the endpoints of the range and any integers provided in the range.

Disclosed herein are asphalt compositions comprising a carboxylated copolymer, a polyalkyleneimine, and asphalt. Methods of making and using the asphalt compositions are also disclosed.

The carboxylated copolymer present in the latex composition can be derived from ethylenically unsaturated monomers. Suitable ethylenically unsaturated monomers for use in forming the copolymer include vinylaromatic compounds (e.g. styrene, α-methylstyrene, o-chlorostyrene, and vinyltoluenes); 1,2-butadiene (i.e. butadiene); conjugated dienes (e.g. 1,3-butadiene and isoprene); α,β-monoethylenically unsaturated mono- and dicarboxylic acids or anhydrides thereof (e.g. acrylic acid, methacrylic acid, crotonic acid, dimethacrylic acid, ethylacrylic acid, allylacetic acid, vinylacetic acid maleic acid, fumaric acid, itaconic acid, mesaconic acid, methylenemalonic acid, citraconic acid, maleic anhydride, itaconic anhydride, and methylmalonic anhydride); esters of α,β-monoethylenically unsaturated mono- and dicarboxylic acids having 3 to 6 carbon atoms with alkanols having 1 to 12 carbon atoms (e.g. esters of acrylic acid, methacrylic acid, maleic acid, fumaric acid, or itaconic acid, with $C_1$-$C_{12}$, $C_1$-$C_8$, or $C_1$-$C_4$ alkanols such as ethyl, n-butyl, isobutyl and 2-ethylhexyl acrylates and methacrylates, dimethyl maleate and n-butyl maleate); acrylamides and alkyl-substituted acrylamides (e.g. (meth)acrylamide, N-tert-butylacrylamide, and N-methyl(meth)acrylamide); (meth)acrylonitrile; vinyl and vinylidene halides (e.g. vinyl chloride and vinylidene chloride); vinyl esters of $C_1$-$C_{18}$ mono- or dicarboxylic acids (e.g. vinyl acetate, vinyl acrylic, vinyl propionate, vinyl n-butyrate, vinyl laurate and vinyl stearate); $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mole of ethylene oxide, propylene oxide, butylene oxide or mixtures thereof (e.g. hydroxyethyl (meth)acrylate, hydroxypropyl (meth)acrylate, and methylpolyglycol acrylate); and monomers containing glycidyl groups (e.g. glycidyl methacrylate). The term "(meth)acryl . . . ," as used herein, includes "acryl . . . ," "methacryl . . . ," or mixtures thereof. The copolymer can be a random copolymer or a block copolymer.

The copolymer can include on more additional monomers. The additional monomers can include, for example, other vinyl aromatic compounds (e.g., α-methylstyrene, o-chlorostyrene, and vinyltoluene); isoprene; anhydrides of α,β-monoethylenically unsaturated monocarboxylic and dicarboxylic acids (e.g., maleic anhydride, itaconic anhydride, and methylmalonic anhydride); other alkyl-substituted acrylamides (e.g., N-tert-butylacrylamide and N-methyl(meth)acrylamide); vinyl and vinylidene halides (e.g., vinyl chloride and vinylidene chloride); vinyl esters of $C_1$-$C_{18}$ monocarboxylic or dicarboxylic acids (e.g., vinyl acetate, vinyl acrylic, vinyl propionate, vinyl N-butyrate, vinyl laurate, and vinyl stearate); $C_1$-$C_4$ hydroxyalkyl esters of $C_3$-$C_6$ monocarboxylic or dicarboxylic acids, for example of acrylic acid, methacrylic acid, or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); monomers containing glycidyl groups (e.g., glycidyl methacrylate); linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-N-butylamino)ethyl vinyl ether, methyldiglycol vinyl ether, and the corresponding allyl ethers); sulfo-functional monomers (e.g., allylsulfonic acid, methallylsulfonic acid, styrene-sulfonate, vinylsulfonic acid, allyloxybenzenesulfonic acid, 2-acrylamido-2-methylpropanesulfonic acid, and their corresponding alkali metal or ammonium salts, sulfopropyl acrylate, and sulfopropyl methacrylate); vinylphosphonic acid, dimethyl vinylphosphonate, and other phosphorus monomers (e.g., phosphoethyl (meth)acrylate); alkylaminoalkyl (meth)acrylates or alkylaminoalkyl(meth)acrylamides or quaternization products thereof (e.g., 2-(N,N-dimethylamino)ethyl (meth)acrylate, 3-(N,N-dimethylamino)propyl (meth)acrylate, 2-(N,N,N-trimethylammonium)ethyl (meth) acrylate chloride, 2-dimethylaminoethyl(meth)acrylamide, 3-dimethylaminopropyl(meth)acrylamide, and 3-trimethylammoniumpropyl(meth)acrylamide chloride); allyl esters of $C_1$-$C_{30}$ monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g., acetoacetoxyethyl (meth)acrylate or diacetone acrylamide); monomers containing urea groups (e.g., ureidoethyl (meth)acrylate, acrylamidoglycolic acid, and methacrylamidoglycolate methyl ether); monoalkyl itaconates; monoalkyl maleates; hydrophobic branched ester monomers; monomers containing silyl groups (e.g., trimethoxysilylpropyl methacrylate), vinyl esters of branched mono-carboxylic acids having a total of 8 to 12 carbon atoms in the acid residue moiety and 10 to 14 total carbon atoms such as, vinyl 2-ethylhexanoate, vinyl neo-nonanoate, vinyl neo-decanoate, vinyl neo-undecanoate, vinyl neo-dodecanoate and mixtures thereof, and copolymerizable surfactant monomers (e.g., those sold under the trademark ADEKA REASOAP). In some embodiments, the one or more additional monomers include (meth) acrylonitrile, (meth)acrylamide, or a mixture thereof. In some embodiments, the copolymer can include the one or more additional monomers in an amount of greater than 0% to 10% by weight, based on the weight of the copolymer. For example, the copolymer can include the one or more additional monomers in an amount of 0.5% to 10%, 0.5% to 5%, 0.5% to 4%, 0.5% to 3%, 0.5% to 2%, or 0.5% to 1% by weight, based on the weight of the copolymer.

The copolymer can include one or more crosslinking monomers. Exemplary crosslinking monomers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glycidyl (meth)acrylate; glyoxal based crosslinkers; monomers containing two vinyl radicals; monomers containing two vinylidene radicals; and monomers containing two alkenyl radicals. Other crosslinking monomers include, for instance, diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, and mixtures thereof. In some embodiments, the copolymer can include from 0.01% to 5% by weight of the copolymer, of the crosslinking agent.

In some embodiments, the copolymer can be derived from ethylenically-unsaturated monomers including vinyl aromatic monomers (e.g., styrene), ethylenically unsaturated aliphatic monomers (e.g., butadiene), (meth)acrylate monomers, vinyl ester monomers (e.g., vinyl acetate and/or vinyl acrylic), and combinations thereof. In some examples, the carboxylated copolymer can be a pure acrylic polymer (i.e., a polymer derived exclusively from (meth)acrylate and/or (meth)acrylic acid monomers), a styrene-butadiene copolymer (i.e., a polymer derived from butadiene and styrene monomers), a styrene-butadiene-styrene block copolymer, a vinyl aromatic-acrylic copolymer (i.e., a polymer derived from vinyl aromatic monomers such as styrene and one or more (meth)acrylate and/or (meth)acrylic acid monomers), a vinyl-acrylic copolymer (i.e., a polymer derived from one or more vinyl ester monomers and one or more (meth)acrylate and/or (meth)acrylic acid monomers [such as poly(vinyl acetate-co-butyl acrylate)] or the polymer can be derived from vinyl acrylate monomers such as vinyl acrylate and/or vinyl methacrylate), a vinyl chloride polymer (i.e., a polymer derived from one or more vinyl chloride monomers), a vinyl alkanoate polymer (i.e., a polymer derived from one or more vinyl alkanoate monomers, such as polyvinyl acetate or a copolymer derived from ethylene and vinyl acetate monomers), polychloroprene, a vinyl acrylic copolymer, or a combination thereof.

The carboxylated copolymer present in the asphalt compositions can be in the form of a latex composition. The latex composition can be an aqueous latex dispersion. In specific embodiments, the copolymer can be a latex composition including styrene, butadiene, and optionally, one or more additional monomers. The styrene can be in an amount of 5% or greater by weight, based on the weight of the copolymer. For example, the styrene can be in an amount of 7% or greater, 10% or greater, 20% or greater, 30% or greater, 40% or greater, 50% or greater, 60% or greater, or 70% or greater by weight, based on the weight of the copolymer. In some embodiments, the styrene can be in an amount of 95% or less, 90% or less, 85% or less, 80% or less, 75% or less, 70% or less, 65% or less, 60% or less, 55% or less, 50% or less, 45% or less, 40% or less, 35% or less, 30% or less, or 25% or less, by weight, based on the weight of the copolymer. The butadiene can be in an amount of 5% by weight of the polymer. For example, the butadiene can be in an amount of 7% or greater, 10% or greater, 20% or greater, 30% or greater, 40% or greater, 50% or greater, 60% or greater, or 70% or greater by weight, based on the weight of the copolymer. In some embodiments, the butadiene can be in an amount of 95% or less, 90% or less, 85% or less, 80% or less, 75% or less, 70% or less, 65% or less, 60% or less, 55% or less, 50% or less, 45% or less, 40% or less, 35% or less, 30% or less, or 25% or less, by weight, based on the weight of the copolymer. In some embodiments, the weight ratio of styrene to butadiene monomers in the copolymer can be from 5:95 to 95:5, from 10:99 to 99:10, from 20:80 to 80:20, from 30:70 to 70:30, or from 40:60 to 60:40. For example, the weight ratio of styrene to butadiene can be 25:75 or greater, 30:70 or greater, 35:65 or greater, or 40:60 or greater.

The copolymer can include a carboxylic acid monomer. For example, the copolymer can include a carboxylated styrene-butadiene copolymer derived from styrene, butadiene, and a carboxylic acid monomer. In some embodiments, the copolymer can be derived from 0.5% or greater, 1.0% or greater, 1.5% or greater, 2.5% or greater, 3.0% or greater, 3.5% or greater, 4.0% or greater, or 5.0% or greater, by weight of a carboxylic acid monomer. In some embodiments, the copolymer can be derived 25% or less, 20% or less, 15% or less, or 10% or less, by weight of a carboxylic acid monomer. In some embodiments, the copolymer can be derived from 0.5%-25%, from 0.5%-10%, from 1.0%-9%, or from 2.0%-8% by weight of a carboxylic acid monomer. Suitable carboxylic acid monomers include (meth)acrylic acid, itaconic acid, fumaric acid, crotonic acid or mixtures thereof. In some embodiments, the copolymer can include itaconic acid in an amount of from 0.5%-25%, from 0.5%-10%, or from 2%-8% by weight of the copolymer. In some embodiments, the copolymer includes one or more of the other monomers provided above.

The copolymer can have a glass-transition temperature (Tg), as measured by differential scanning calorimetry (DSC) using the mid-point temperature as described, for example, in ASTM 3418/82, of from −90° C. to less than 110° C. In some embodiments, the copolymer has a measured Tg of greater than −90° C. (for examples, greater than −80° C., greater than −70° C., greater than −60° C., greater than −50° C., greater than −40° C., greater than −30° C., greater than −20° C., greater than −10° C., greater than 0° C., greater than 10° C., greater than 20° C., or greater than 25° C.). In some cases, the copolymer has a measured Tg of less than 110° C. (e.g., less than 100° C., less than 90° C., less than 80° C., less than 70° C., less than 60° C., less than 50° C., less than 40° C., less than 30° C., less than 25° C., less than 20° C., less than 10° C., less than 0° C., less than −10° C., less than −20° C., or less than −30° C.). In certain embodiments, the copolymer has a measured Tg of from −60° C. to less than 100° C., from −50° C. to less than 100° C., from −30° C. to less than 100° C., from −60° C. to 60° C., from −60° C. to 35° C., from −45° C. to 25° C., from −30° C. to 35° C., or from −30° C. to 25° C. In some embodiments, the copolymer can have a Tg of from −30° C. to 10° C.

In some embodiments, the copolymer in the latex composition can include a styrene-butadiene copolymer. In specific embodiments, the copolymer in the latex composition can include a carboxylated styrene-butadiene copolymer. The styrene-butadiene latex composition can have an overall anionic charge, cationic charge, or is non-ionic.

As described herein, the copolymer can be an aqueous latex composition comprising particles of the copolymer dispersed in water. In some embodiments, the latex composition can be prepared with a total solids content of from 5% to 90% by weight, for example, 10% to 80% by weight, 20% to 70% by weight, 25% to 65% by weight, 35% to 60% by weight, or 45% to 60% by weight, based on the weight of the latex composition. In some embodiments, the latex composition can have a total solids content of 40% or greater or 50% or greater by weight, based on the weight of the latex composition. In some embodiments, the latex composition can have a total solids content of 90% or less, 80% or less, or 70% or less by weight, based on the weight of the latex composition. The copolymer particles in the latex composition can have an average particle size of from 20 nm to 5000 nm, such as from 20 nm to 1000 nm, from 30 nm to 500 nm, or from 50 nm to 250 nm. The particle size of the copolymer particles can be measured using dynamic light scattering measurements, for example using a Nicomp Model 380 available from Particle Sizing Systems, Santa Barbara, CA.

The latex composition can include an antioxidant to prevent oxidation of, for example, the double bonds of the styrene butadiene polymer. Suitable antioxidants can include substituted phenols or secondary aromatic amines. The composition can include antiozonants to prevent ozone present in the atmosphere from, for example, cracking the styrene butadiene polymer, by cleaving the double bonds of the styrene butadiene polymer. The latex composition can include prevulcanization inhibitors to prevent premature vulcanization or scorching of the polymer. Suitable antioxidants, antiozonants, and prevulcanization inhibitors are disclosed in U.S. Pat. No. 8,952,092. The antioxidants, antiozonants, and/or prevulcanization inhibitors can be provided in an amount from 1% to 5% by weight, based on the weight of the solids in the latex composition.

The latex composition can be in an amount of 0.5% or greater by weight, based on the weight of the asphalt composition. In some embodiments, the asphalt composition can include the latex composition in an amount of 1% or greater, 1.5% or greater, 2% or greater, 2.5% or greater, 3% or greater, 3.5% or greater, 4% or greater, 4.5% or greater, 5% or greater, 6% or greater, 7% or greater, 8% or greater, 9% or greater, 10% or greater, 11% or greater, 12% or greater, 13% or greater, or 14% or greater by weight, based on the weight of the asphalt composition. In some embodiments, the asphalt composition can include the latex composition in an amount of 15% or less, 12% or less, 10% or less, 8% or less, 7% or less, 6% or less, 5% or less, 4% or less, 3% or less, 2% or less, or 1% or less by weight, based on the weight of the asphalt composition. In some embodiments, the asphalt composition can include the latex composition in an amount of 0.5% to 15%, 0.5% to 12%, 0.5% to 10%, 1% to 15%, or 1% to 10% by weight, based on the weight of the asphalt composition.

The asphalt compositions can further include an additive to decrease the drying time of the asphalt compositions. The additive can include a polyamine such as a polyalkyleneimine Polyamines are compounds which contain a plurality of primary amine groups, secondary amine groups, tertiary amine groups, or combinations thereof. Generally, the polyamine contains at least three primary amine groups, secondary amine groups, or combinations thereof. For example, the polyamine can contain at least 5 primary and/or secondary amine groups, at least 10 primary and/or secondary amine groups, at least 15 primary and/or secondary amine groups, at least 20 primary and/or secondary amine groups, at least 25 primary and/or secondary amine groups, at least 50 primary and/or secondary amine groups, or more. The polyamines can optionally further contain one or more tertiary amine groups.

In some embodiments, the polyamine can include a polyalkyleneimine. The polyalkyleneimine can be a polymer or copolymer derived from one or more monomers containing an amine group. Suitable monomers of this type include alkyleneimines such as ethyleneimine, propyleneimine or combinations thereof. Other suitable amino-containing monomers include (meth)acrylate monomers containing one or more primary, secondary and/or tertiary amine groups, such as 2-aminoethyl methacrylate, 2-aminoethyl acrylate, 2-(tert-butylamino)ethyl acrylate, 2-(tert-butylamino)ethyl methacrylate. In some embodiments, the polyalkyleneimine is an acrylic polymer derived from one or more monomers comprising an amino group.

The polyalkyleneimines can be highly branched polyamines characterized by the empirical formula $(C_2H_5N)_n$ with a repeating molecular mass of 43.07. They are commercially prepared by acid-catalyzed ring opening of ethyleneimine, also known as aziridine. The amine groups of the polyalkyleneimine can exist mainly as a mixture of primary, secondary and tertiary groups in the ratio of about 1:1:1 to about 1:2:1 with branching every 3 to 35 nitrogen atoms along a chain segment. Because of the presence of amine groups, the polyalkyleneimine can be protonated with acids to form a polyalkyleneimine salt from the surrounding medium resulting in a product that is partially or fully ionized depending on pH. For example, about 73% of polyethyleneimine is protonated at pH 2, about 50% of polyethyleneimine is protonated at pH 4, about 33% of polyethyleneimine is protonated at pH 5, about 25% of polyethyleneimine is protonated at pH 8 and about 4% of polyethyleneimine is protonated at pH 10. In some instances, the asphalt compositions disclosed herein are below about pH 6, and therefore a polyethyleneimine would be about 4-30% protonated and about 70-96% unprotonated.

It should be noted that linear polyethyleneimines as well as mixtures of linear and branched polyethyleneimines are useful in the asphalt compositions of the present disclosure. Linear polyethyleneimines can be obtained by cationic polymerization of oxazoline and oxazine derivatives. Methods for preparing linear PEI (as well as branched PEI) are more fully described in Advances in Polymer Science, Vol 102, pgs 171-188, 1992 (references 6-31) which is incorporated in its entirety herein by reference.

In some embodiments, the polyalkyleneimine can include a derivatized polyalkyleneimine. Derivatized polyalkyleneimine as used herein are polyamines that are N-derivatized such that one or more amine nitrogens have been derivatized (i.e., some number of the primary and/or secondary amine groups within the polyamine have been covalently modified to replace one or more hydrogen atoms in the primary and/or secondary amine groups with a non-hydrogen moiety). For example, in the case of polyamines containing one or more primary amine groups, derivatized polyalkyleneimine can include polyamines where at least a portion of the primary amine groups have been converted to either secondary or tertiary amine groups. In the case of polyamines containing one or more secondary amine groups, derivatized polyamines can include polyamines where at least a portion of the secondary amine groups have been converted to tertiary amines.

Suitable derivatized polyalkyleneimine are known in the art, and include polyamines in which some number of the primary and/or secondary amine groups have been covalently modified to replace one or more hydrogen atoms with a non-hydrogen moiety (R). In some embodiments, each R within the derivatized polyalkyleneimine is individually selected from the group consisting of a $C_{1-6}$ alkyl group, optionally substituted with one or more hydroxyl groups; an acyl group (—COR'), wherein R' is a $C_1$-$C_6$ alkyl group or a $C_5$-$C_7$ aryl or heteroaryl group, optionally substituted with one or more hydroxyl groups; (—COOR''), wherein R'' is a $C_1$-$C_6$ alkyl group or a $C_5$-$C_7$ aryl or heteroaryl group, optionally substituted with one or more hydroxyl groups; (—SO$_2$R'''), wherein R''' is a $C_1$-$C_6$ alkyl group or a $C_5$-$C_7$ aryl or heteroaryl group, optionally substituted with one or more hydroxyl groups, and a poly(alkylene oxide) group. The R groups present within a derivatized polyalkyleneimine can be selected such that the derivatized polyalkyleneimine possesses a hydrophilicity which renders the derivatized polyalkyleneimine compatible with the aqueous compositions described herein. For example, the R groups within the derivatized polyalkyleneimine can be selected such that the derivatized polyalkyleneimine is water soluble or water dispersible. In some embodiments, at least 50% of the derivatized amine groups are alkoxylated amine groups.

In some embodiments, the derivatized polyalkyleneimine includes alkoxylated polyalkyleneimine groups. Suitable alkoxylated polyalkyleneimine include alkoxylated polyalkyleneimines derived from 2 to 8 carbon alkylene oxides. In certain instances, the alkoxylated polyalkyleneimine is derived from ethylene oxide, propylene oxide, butylene oxide, or combinations thereof. In particular embodiments, the alkoxylated polyalkyleneimine is an alkoxylated polyalkyleneimine, an alkoxylated polyvinylamine, or a combination thereof. Suitable alkoxylated polyvinylamines include those described in U.S. Pat. No. 7,268,199 to Andre, et al. which is incorporated herein by reference for its teaching of alkoxylated polyvinylamines. Suitable alkoxylated polyalkyleneimines, as well as methods of making thereof, are also known in the art. See, for example, U.S. Pat. No. 7,736,525 to Thankachan, et al, U.S. Pat. No. 6,811,601 to Borzyk, et al. and WO 99/67352, all of which are incorporated herein by reference for their teaching of alkoxylated polyalkyleneimines. Suitable alkoxylated polyalkyleneimine also include, for example, those described in U.S. Pat. No. 8,193,144 to Tanner, et al, which is incorporated herein by reference for the alkoxylated polyalkyleneimine described therein. In particular embodiments, the composition can contain an ethoxylated polyethyleneimine, a propoxylated polyethyleneimine, a butoxylated polyethyleneimine, or a combination thereof.

In some embodiments, the derivatized polyalkyleneimine includes an alkylated polyalkyleneimine (e.g., an alkylated polyethyleneimine or an alkylated polyvinylamine), a hydroxyalkylated polyalkyleneimine (e.g., a hydroxyalkylated polyethyleneimine or a hydroxyalkylated polyvinylamine), an acylated polyalkyleneimine (e.g., an acylated polyethyleneimine or an acylated polyvinylamine), or a combination thereof.

Generally, the polyalkyleneimine will have a degree of nitrogen-derivatization, defined as the percentage of available nitrogens within the polyamine that have been covalently modified to replace one or more hydrogen atoms with a non-hydrogen moiety, of at least 5%. In certain embodiments, the polyalkyleneimine has a degree of nitrogen-derivatization of at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, or at least 90%. In certain embodiments, the polyalkyleneimine has a degree of nitrogen-derivatization of less than 99%, less than 98%, less than 97%, less than 95%, less than 90%, less than 85%, less than 80%, or less than 75%. In some embodiments, the polyalkyleneimine has a degree of nitrogen-derivatization between 5% and 100%. In certain embodiments, the polyalkyleneimine has a degree of nitrogen-derivatization between 50% and 95% or between 70% and 90%. In embodiments where the polyalkyleneimine is an alkoxylated polyamine, the degree of nitrogen-derivatization can be referred to as the degree of nitrogen alkoxylation, defined as the percentage of available nitrogens within the polyalkyleneimine that have been converted to a corresponding hydroxyalkyl group.

The polyalkyleneimine can be characterized by the ratio of nitrogen to carbon present. In some embodiments, the polyalkyleneimine has a ratio of nitrogen to carbon of 1:2 or less, 1:3 or less, 1:4 or less, 1:5 or less, 1:6 or less, 1:8 or less, or 1:10 or less. In some embodiments, the polyalkyleneimine has a ratio of nitrogen to carbon of 1:100 or greater, 1:50 or greater, 1:20 or greater, 1:10 or greater, 1:8 or greater, 1:6 or greater, 1:5 or greater, 1:4 or greater, or 1:3 or greater. In some embodiments, the polyalkyleneimine has a ratio of nitrogen to carbon of from 1:100 to 1:2, from 1:50 to 1:2, from 1:20 to 1:2, from 1:10 to 1:2, from 1:5 to 1:2, or from 1:4 to 1:2.

In some embodiments, the polyalkyleneimine has an average molecular weight of greater than 20,000 Daltons, greater than 25,000 Daltons, greater than 30,000 Daltons, greater than 35,000 Daltons, greater than 40,000 Daltons, greater than 50,000 Daltons, greater than 60,000 Daltons, greater than 70,000 Daltons, greater than 80,000 Daltons, greater than 90,000 Daltons, or greater than 100,000 Daltons. The polyalkyleneimine can have an average molecular weight of less than 2,000,000 Daltons, less than 1,500,000, less than 1,000,000, less than 750,000 Daltons, 550,000 Daltons, less than 500,000 Daltons, less than 450,000 Daltons, less than 400,000 Daltons, less than 350,000 Daltons, less than 300,000 Daltons, less than 250,000 Daltons, less than 200,000 Daltons, less than 175,000 Daltons, less than 150,000 Daltons, less than 125,000 Daltons, or less than 100,000 Daltons. In certain embodiments, the polyalkyleneimine has an average molecular weight of from 50,000 to 2,000,000 Daltons, from 50,000 Daltons to 500,000 Daltons, from 50,000 Daltons to 250,000 Daltons, or from 100,000 and 200,000 Daltons.

The polyalkyleneimines are generally incorporated into the asphalt compositions in amounts less than 10% by weight, based on the dry weight of the copolymer. The amount of polyalkyleneimines present in the composition can be selected in view of the identity of the polyalkyleneimines, the nature of the copolymer present in the composition, and the desired drying time of the composition. In some embodiments, the polyalkyleneimine is present in an amount greater than 0.05% by weight, such as 0.1% by weight or greater, 0.2% by weight or greater, greater than 0.25% by weight or greater, greater than 0.3% by weight or greater, 0.4% by weight or greater, 0.5% by weight or greater, 0.6% by weight or greater, 0.7% by weight or greater, 0.8% by weight or greater, 0.9% by weight or greater, 1.0% by weight or greater, 1.5% by weight or greater, 2.0% by weight or greater, 2.5% by weight or greater, 3.0% by weight or greater, 3.5% by weight or greater, 4.0% by weight or greater, 4.5% by weight or greater, or 5.0% by weight or greater. In some instances, the polyalkyleneimine is present in an amount 10% by weight or less, 8.0% by weight or less, 7.5% by weight or less, 6.0% by weight or less, 5.0% by weight or less, 4.5% by weight or less, 4.0% by weight or less, 3.5% by weight or less, 3.0% by weight or less, 2.5% by weight or less, 2.0% by weight or less, 1.5% by weight or less, 1.0% by weight or less, or 0.5% by weight or less.

In some embodiments, the polyalkyleneimine is present in the composition at from 0.1% by weight to 10% by weight, based on the dry weight of the copolymer. In certain embodiments, the polyalkyleneimine is present in the composition at from 0.1% by weight to 5% by weight, from 0.5% by weight to 5% by weight, or from 0.5% by weight to 2.5% by weight, based on the dry weight of the copolymer. Polyalkyleneimine having a range of molecular weights and degrees of nitrogen-derivatization can be incorporated into the asphalt compositions. The drying time of the composition, as well as the physical properties of the resultant asphalt, can be varied by selection of the loading level, molecular weight, microstructure (e.g., degree of branching), and the degree of nitrogen-derivatization of the polyalkyleneimine. The drying time of the composition, as well as the physical properties of the resultant asphalt, can also be influenced by ambient conditions during asphalt application and drying, including humidity and temperature. In some embodiments, a particular polyalkyleneimine is incorporated into the asphalt composition at a particular loading level in view of ambient conditions, including humidity and temperature, to achieve an asphalt having a desired drying time, desired physical properties, or a combination thereof.

The polyalkyleneimines suitable for use in the asphalt compositions can have the general formula: $(-NHCH_2CH_2-)_x[-N(CH_2CH_2NH_2)CH_2CH_2-]_y$, wherein x is an integer from about 1 to about 120,000 (for example, from about 2 to about 60,000 or from about 3 to about 24,000) and y is an integer from about 1 to about 60,000 (for example, from about 2 to about 30,000 or from about 3 to about 12,000). Specific examples of polyalkyleneimines are PEI-10,000, PEI-25,000, PEI 50,000, PEI-70,000, PEI-500,000, PEI-5,000,000 and the like, wherein the integer represents the average molecular weight of the polymer. PEI's which are designated as such are available through Aldrich.

Polyalkyleneimines are also commercially available from the BASF Corporation under the trade name Lupasol® (also sold as Polymin®). These compounds can be prepared as a wide range of molecular weights and product additives. Examples of commercial polyalkyleneimines sold by BASF suitable for use in the asphalt compositions include, but are not limited to, Lupasol® SC, Lupasol® FG, Lupasol® G-35, Lupasol® G-20, Lupasol® P, Lupasol® PS, Lupasol® G-20

Water-Free and the like. Polyalkyleneimines are also commercially available from Polymer Enterprises or Nippon Soda (of Japan) under the trade name Epomin®. Examples of commercial polyalkyleneimines sold by Polymer Enterprises or Nippon Soda suitable for use in the present case include, but are not limited to Epomin® SP012®, Epomin® P1050®, Epomin® SP103®, Epomin® SP003®, Epomin® SP006® and the like.

The asphalt compositions described herein can also contain a base. In some embodiments, the base can be a volatile base. Volatile bases are basic substances that are soluble in water, remain in the composition under normal storage conditions, and evaporate from the composition under suitable drying conditions.

Generally, one or more bases are incorporated in the composition in an effective amount to maintain the pH of the asphalt composition greater than 7, greater than 8, greater than 8.5, greater than 9, greater than 9.5, or greater than 10. In some embodiments, one or more bases are incorporated in the composition in an effective amount to maintain the pH of the asphalt composition in the range of from 7.5 to 12.5, from greater than 8 to 12, from greater than 9 to 11, from 10 to 11, or from greater than 10 to 11. In some embodiments, one or more bases can be incorporated in the composition at from 0.1% by weight to 10.0% by weight or from 0.1% by weight to 5.0% by weight. In certain embodiments, one or more bases are incorporated in the composition at from 0.5% by weight to 2.5% by weight.

Suitable bases can be selected on the basis of several factors, including their alkalinity and volatility. Exemplary bases include, but are not limited to, ammonia, lower alkylamines such as dimethylamine, triethylamine, and diethylamine, ethanolamine, diethanolamine, triethanolamine, morpholine, aminopropanol, 2-amino-2-methyl-1-propanol, 2-dimethylaminoethanol, and combinations thereof. In certain embodiments, the base is ammonia. In some cases, ammonia is the sole base present in the composition. Alternatively, ammonia can be incorporated in admixture with other bases, such as alkali metal hydroxides, or combinations thereof.

The asphalt compositions can also include a photoinitiator. Photoinitiators are compounds that can generally bring about a crosslinking reaction of a polymer by exposure to sunlight. In some embodiments, the photoinitiator can be a non-polymerizable photoinitiator. Examples of suitable compounds for use as a photoinitiator are those having a diaryl ketone structure, such as benzophenone, thioxanthone, and derivatives thereof. In these compounds, one or both phenyl rings may be substituted one or more times. Suitable substituents are $C_1$-$C_4$ alkyl, e.g., methyl, hydroxyl, $C_1$-$C_4$ alkyloxy, hydroxy-$C_1$-$C_4$ alkyl, hydroxy-$C_1$-$C_4$ alkyloxy, amino, $C_1$-$C_4$ alkylamino, nitro, carboxyl, carboxy-$C_1$-$C_4$ alkyl, e.g., carboxymethyl, acyloxy such as acryloyloxy and methacryloyloxy, and nitro. Also suitable are substituents which give the photoinitiator increased solubility in water. Substituents of this kind have neutral or ionic groups such as trialkylammonium groups, e.g., triethylammonium and trimethylammonium groups, sulfonate groups, carboxylate groups, or polyalkylene oxide groups. Examples of such substituents are: trimethylammonium methyl, trimethylammonium propyloxy, 2-hydroxy-3-trimethylammonium (each as the chloride), sulfomethyl, 3-sulfopropyloxy (each as the sodium salt), and HO—$(C_2H_4$—$O)_n$—, where n is from 2 to 100. In some embodiments, the photoinitiator used in the asphalt compositions include benzophenone and/or its derivatives. In some examples, the benzophenone derivatives include one or more phenyl ring substituents, for instance those which have only one substituent, and specifically to those in which this substituent is located in position 4 of the phenyl ring. Examples of particularly suitable benzophenone derivatives are 4-methylbenzophenone, 4-hydroxybenzophenone, 4-aminobenzophenone, 4-chlorobenzophenone, 4-carboxybenzophenone, 4,4'-dimethylbenzophenone, 4,4'-dichlorobenzophenone, 4-carboxymethylbenzophenone, 3-nitrobenzophenone, and 2,4,6-trimethylbenzophenone. Examples of suitable benzophenone derivatives having increased solubility in water are benzophenone 4-methanesulfonate, 3-(4-benzoylphenoxy)propanesulfonate, in each case as the sodium salt, 4-benzoylbenzyltrimethylammonium chloride (=4-(trimethylammoniummethyl)benzophenone as the chloride) and 2-hydroxy-3-(4-benzoylphenoxy)propane-1-trimethylammonium chloride. Benzophenone can be used as the non-polymerizable photoinitiator. Examples of this kind are 2,4,6-trimethylbenzophenone/benzophenone in a molar ratio of from 1.3:1 to 1:1 or 1-hydroxycyclohexyl phenyl ketone/benzophenone in a molar ratio, for example, of 1:1. Mixtures of this kind are described in EP-A-209 831, which to that extent is hereby incorporated by reference.

The photoinitiators are used in the asphalt composition in an amount of 0.01% by weight or less, based on the copolymer. For example, the amount of photoinitiator used can be 0.05% by weight or greater, 0.1% by weight or greater, 0.2% by weight or greater, 0.3% by weight or greater, 0.4% by weight or greater, 0.5% by weight or greater, or 1% by weight or greater, based on the copolymer. In some embodiments, the amount of photoinitiator used can be 5% by weight or less, 4% by weight or less, 3% by weight or less, 2.5% by weight or less, 2% by weight or less, 1.5% by weight or less, 1% by weight or less, 0.9% by weight or less, 0.5% by weight or less, 0.4% by weight or less, 0.3% by weight or less, or 0.2% by weight or less, based on the copolymer. In some embodiments, the amount of photoinitiator used can be from 0.01% to less than 5%, from 0.01% to 2.5%, from 0.1% to 2.5%, from 0.5% to less than 1.5%, based on the copolymer. In some embodiments, the amount of photoinitiator used can be from 0.01% to 5% by weight, from 0.01% to 5% by weight, from 0.1% to 5% by weight, from 0.1% to 2.5% by weight, from 0.1% to 2% by weight, from 0.5% to 2% by weight, based on the asphalt composition.

As described herein, the asphalt compositions include asphalt. The term "asphalt" as used herein, includes the alternative term "bitumen." Thus, the asphalt compositions can be termed bitumen compositions. "Asphalt compositions" or "asphalt formulations" as used herein, include asphalt emulsions and hot-mix asphalt compositions. In some embodiments, the asphalt can be an anionic asphalt emulsion. The anionic asphalt emulsion can include asphalt, water, and an anionic surfactant. In some embodiments, the asphalt can be a cationic asphalt emulsion. The cationic asphalt emulsion can include asphalt, water, and a cationic surfactant. The asphalt can be molten asphalt.

In some embodiments, the asphalt used in the compositions disclosed herein has a high temperature true performance grade of 45° C. or greater, such as 48° C. or greater, 50° C. or greater, 52° C. or greater, 54° C. or greater, 55° C. or greater, 56° C. or greater, or 58° C. or greater, as determined by AASHTO test TP5. In some embodiments, the asphalt used in the compositions disclosed herein has a low temperature true performance grade of −10° C. or less, −15° C. or less, −20° C. or less, −25° C. or less, −28° C. or less, such as −30° C. or less, −32° C. or less, −34° C. or less, −35° C. or less, −40° C. or less, as determined by AASHTO test TP5. The compositions disclosed herein are applicable to various types of asphalts, including asphalts softer than PG 64-22. Specifically, the compositions disclosed herein can be used with asphalts such as PG 58-28 asphalts or softer.

In some embodiments, the asphalt is provided as an asphalt emulsion. As discussed herein, the asphalt emulsion can include asphalt and one or more surfactants (emulsifiers) such as nonionic surfactants, anionic surfactants, cationic surfactants, amphoteric surfactants, or a mixture thereof. In some embodiments, the asphalt emulsion can include an amine-derived surfactant. Suitable surfactants include polyamines, fatty amines, fatty amido-amines, ethoxylated amines, diamines, imidazolines, quaternary ammonium salts, derivatives thereof, and mixtures thereof. Examples of commercially available surfactants that can be used in the latex composition include those available from Akzo Nobel under the REDICOTE® trademark (such as REDICOTE® 4819, REDICOTE® E-64R, REDICOTE® E-5, REDICOTE® E-9, REDICOTE® E9A, REDICOTE® E-11, REDICOTE® E-16, REDICOTE® E-44, REDICOTE® E-62, REDICOTE® E-120, REDICOTE® E-250, REDICOTE® E-2199, REDICOTE® E-4868, REDICOTE® E-7000, REDICOTE® C-346, REDICOTE® C-404, REDICOTE® C-450, and REDICOTE® C-471), surfactants available from Ingevity under the INDULIN® and AROSURF® trademarks (such as INDULIN® 201, INDULIN® 202, INDULIN® 206, INDULIN® 814, INDULIN® AA-54, INDULIN® AA-57, INDULIN® AA-78, INDULIN® AA-86, INDULIN® AA-89, INDULIN® AMS, INDULIN® DF-30, INDULIN® DF-40, INDULIN® DF-42, INDULIN® DF-60, INDULIN® DF-80, INDULIN® EX, INDULIN® FRC, INDULIN® HFE, INDULIN® IFE, INDULIN® MQK, INDULIN® MQK-1M, INDULIN® MQ3, INDULIN® QTS, INDULIN® R-20, INDULIN® FST (also known as PC-1542), INDULIN® SA-L, INDULIN® SBT, INDULIN® W-1, and INDULIN® W-5), ASFIER® N480 available from Kao Specialties Americas, CYPRO™ 514 available from Cytec Industries, polyethyleneimines such as those available from BASF under the POLYMIN® trademark (such as POLYMIN® SK, POLYMIN® SKA, POLYMIN® 131, POLYMIN® 151, POLYMIN® 8209, POLYMIN® P, and POLYMIN® PL), polyvinylamines such as those available from BASF under the CATIOFAST® trademark (such as CATIOFAST® CS, CATIOFAST® FP, CATIOFAST® GM, and CATIOFAST® PL), and tall oil fatty acids.

In some embodiments, the asphalt emulsion can be an anionic asphalt emulsion. The anionic asphalt emulsion generally has a high pH, such as a pH greater than 7. For example, the asphalt emulsion can have a pH of 7.5 or greater, 8 or greater, 8.5 or greater, 9 or greater, or 9.5 or greater. In some examples, the asphalt emulsion can have a pH of 12 or less, 11.5 or less, 11 or less, 10.5 or less, 10 or less, 9.5 or less, 9 or less, 8.5 or less, or 8 or less. In some embodiments, the asphalt emulsion can have a pH of from greater than 7 to 12, from 7.5 to 11, or from 8 to 11.

In some embodiments, the asphalt emulsion can be a cationic asphalt emulsion. The cationic asphalt emulsion generally has a low pH, such as a pH of 7 or less. For example, the asphalt emulsion can have a pH of 6.5 or less, 6 or less, 5.5 or less, 5 or less, 4.5 or less, 4 or less, 3.5 or less, 3 or less, or 2.5 or less. In some examples, the asphalt emulsion can have a pH of 1.5 or greater, 2 or greater, 2.5 or greater, 3 or greater, 3.5 or greater, 4 or greater, 4.5 or greater, 5 or greater, 5.5 or greater, 6 or greater, 6.5 or greater, or 7 or greater. In some embodiments, the asphalt emulsion can have a pH of from 1.5 to 7, from 2 to 6.5, from 1.5 to 6, from 2 to 6, from 3 to 7, from 3 to 6.5, from 3 to 6, from 4 to 7, from 4 to 6.5, or from 4 to 6.

The asphalt compositions can include 50% or greater by weight of the asphalt compositions, of asphalt. In some embodiments, the asphalt compositions can include 55% or greater, 60% or greater, 65% or greater, 70% or greater, 75% or greater, 80% or greater, 85% or greater, 90% or greater, 95% or greater, or 99% or greater by weight of the asphalt composition, of asphalt. In some embodiments, the asphalt compositions can include 99.9% or less, 99% or less, 95% or less, 90% or less, 87% or less, 85% or less, 83% or less, or 80% or less by weight of the asphalt composition, of asphalt. In some embodiments, the asphalt compositions can include 50% to 95%, 50% to 90%, 50% to 85%, 50% to 80%, 60% to 95%, 60% to 90%, or 60% to 80% by weight of the asphalt composition, of asphalt.

The carboxylated copolymer such as a carboxylated styrene-butadiene copolymer and the asphalt can be present in a weight ratio of from 1:99 to 1:10, such as from 1:99 to 1:50, from 1:99 to 1:80, from 1:99 to 1:90, from 1:98 to 1:90, or from 1:98 to 1:95.

The asphalt compositions can include a basic salt. Suitable basic salts can include the salt of a strong base and a weak acid. In some embodiments, the asphalt compositions can include a basic salt selected from sodium sulfate, potassium sulfate, magnesium sulfate, aluminum sulfate, iron sulfate, cobalt sulfate, barium sulfate, beryllium sulfate, copper sulfate, zinc sulfate, manganese sulfate, sodium carbonate, sodium bicarbonate, potassium carbonate, potassium bicarbonate, potassium sodium carbonate, sodium bisulfate, ammonium bisulfite, potassium bisulfate, potassium sulfite, sodium sulfite, potassium hydrogen sulfite, ammonium sulfite, disodium hydrogen phosphate, sodium dihydrogen phosphate, dipotassium hydrogen phosphate, and mixtures thereof. In some embodiments, the basic salt can include aluminum sulfate. The basic salt, such as aluminum sulfate can be in an amount of from 0.01% to 5%, 0.05% to 4%, 0.1% to 5%, 0.2% to 4%, or 0.3% to 3%, by weight, based on the weight of the asphalt composition. The asphalt formulation can include the basic salt in an amount such that the pH of the asphalt formulation has a pH of from 1.5 to 10, such as from 1.5 to 6 or from 8 to 10.

As discussed herein, the asphalt compositions can include a solvent such as water to disperse or emulsify the polymer and/or the asphalt. The asphalt composition can include water in an amount of 1% to 35%, 5% to 30%, or 5% to 25% by weight, based on the weight of the asphalt composition. In some instances, the asphalt compositions can include a second solvent, in addition to water. For example, the asphalt composition can include a rejuvenating (or recycling) agent that includes a non-aqueous solvent and optionally water. The rejuvenating agent can include any known rejuvenating agent appropriate for the type of asphalt surface that the asphalt compositions are applied to. Rejuvenating (recycling) agents are classified into types such as RA-1, RA-5, RA-25, and RA-75 as defined by ASTM D4552. The rejuvenating agent used herein can be a material that resembles the maltene fraction of asphalt such as a RA-1 rejuvenating agent, a RA-5 rejuvenating agent, or mixtures thereof. In some examples, the rejuvenating agent is a RA-1 recycling agent such as those available as RA-1 from vendors such as San Joaquin Refining or Tricor Refining or under the trade name HYDROLENE® (such as HYDROLENE® HT100T) from Sunoco.

The amount of rejuvenating agent can be from 0% to 15% by weight, such as from 2 to 15% or 2 to 8% by weight, or from 3% to 6% by weight (e.g. 5% by weight) of the asphalt composition.

The asphalt compositions can be vulcanized or cured to crosslink the copolymer in the latex composition, thereby increasing the tensile strength and elongation of the copolymer. In some embodiments, the asphalt compositions can include vulcanizing (curing) agents, vulcanization accelerators, antireversion agents, or a combination thereof. In some embodiments, the vulcanizing agents, vulcanization accelerators, and/or antireversion agents can be included in the latex composition. Exemplary vulcanizing agents are sulfur curing agents and include various kinds of sulfur such as sulfur powder, precipitated sulfur, colloidal sulfur, insoluble sulfur and high-dispersible sulfur; sulfur halides such as sulfur monochloride and sulfur dichloride; sulfur donors such as 4,4'-dithiodimorpholine; selenium; tellurium; organic peroxides such as dicumyl peroxide and di-tert-butyl peroxide; quinone dioximes such as p-quinone dioxime and p,p'-dibenzoylquinone dioxime; organic polyamine compounds such as triethylenetetramine, hexamethylenediamine carbamate, 4,4'-methylenebis(cyclohexylamine) carbamate and 4,4'-methylenebis-o-chloroaniline; alkylphenol resins having a methylol group; and mixtures thereof. The vulcanizing agent can be present from 0.01 to 1% or from 0.01 to 0.6% by weight, based on the weight of the asphalt formulation.

Exemplary vulcanization accelerators include sulfenamide-type vulcanization accelerators such as N-cyclohexyl-2-benzothiazole sulfenamide, N-t-butyl-2-benzothiazole sulfenamide, N-oxyethylene-2-benzothiazole sulfenamide, N-oxydiethylene-2-benzothiazole sulfenamide, N-oxydiethylene-thiocarbamyl-N-oxydiethylene sulfenamide, N-oxyethylene-2-benzothiazole sulfenamide and N,N'-diisopropyl-2-benzothiazole sulfenamide; guanidine-type vulcanization accelerators such as diphenylguanidine, di-o-tolylguanidine and di-o-tolylbiguanidine; thiourea-type vulcanization accelerators such as thiocarboanilide, di-o-tolylthiourea, ethylenethiourea, diethylenethiourea, dibutylthiourea and trimethylthiourea; thiazole-type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt, 4-morpholinyl-2-benzothiazole disulfide and 2-(2,4-dinitrophenylthio)benzothiazole; thiadiazine-type vulcanization accelerators such as activated thiadiazine; thiuram-type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamic acid-type vulcanization accelerators such as sodium dimethyldithiocarbamate, sodium diethyldithiocarbamate, sodium di-n-butyldithiocarbamate, lead dimethyldithiocarbamate, lead diamyldithiocarbamate, zinc diamyldithiocarbamate, zinc dimethyldithiocarbamate, zinc diethyldithiocarbamate, zinc di-n-butyldithiocarbamate, zinc pentamethylene dithiocarbamate, zinc ethylphenyldithiocarbamate, tellurium diethyldithiocarbamate, bismuth dimethyldithiocarbamate, selenium dimethyldithiocarbamate, selenium diethyldithiocarbamate, cadmium diethyldithiocarbamate, copper dimethyldithiocarbamate, iron dimethyldithiocarbamate, diethylamine diethyldithiocarbamate, piperidinium pentamethylene dithiocarbamate and pipecoline pentamethylene dithiocarbamate; xanthogenic acid-type vulcanization accelerators such as sodium isopropylxanthogenate, zinc isopropylxanthogenate and zinc butylxanthogenate; isophthalate-type vulcanization accelerators such as dimethylammonium hydrogen isophthalate; aldehyde amine-type vulcanization accelerators such as butyraldehyde-amine condensation products and butyraldehyde-monobutylamine condensation products; and mixtures thereof. The vulcanization accelerator can be present in an amount of from 0.01 to 1% or from 0.01 to 0.6% by weight, based on the weight of the asphalt formulation.

Antireversion agents can also be included to prevent reversion, i.e., an undesirable decrease in crosslink density. Suitable antireversion agents include zinc salts of aliphatic carboxylic acids, zinc salts of monocyclic aromatic acids, bismaleimides, biscitraconimides, bisitaconimides, aryl biscitraconamic acids, bissuccinimides, and polymeric bissuccinimide polysulfides (e.g., N,N'-xylenedicitraconamides). The antireversion agent can be present in an amount of from 0.01 to 1% or from 0.01 to 0.6% by weight, based on the weight of the asphalt composition.

The asphalt compositions can further include one or more additional additives. Suitable additional additives include chloride salts, thickeners, and fillers. Chloride salts can be added, for example to improve emulsifiability, in an amount of up to 1 part by weight. Suitable chloride salts include sodium chloride, potassium chloride, calcium chloride, aluminum chloride, or mixtures thereof. Thickeners can be added in an amount of 0.5 parts by weight or greater and can include associative thickeners, polyurethanes, alkali swellable latex thickeners, cellulose, cellulose derivatives, modified cellulose products, plant and vegetable gums, starches, alkyl amines, polyacrylic resins, carboxyvinyl resins, polyethylene maleic anhydrides, polysaccharides, acrylic copolymers, hydrated lime (such as cationic and/or nonionic lime), or mixtures thereof. In some embodiments, the asphalt compositions described herein do not include a thickener. Mineral fillers and/or pigments can include calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxides (e.g., titanium dioxide), aluminum hydroxide, aluminum trihydrate, satine white, magnesium oxide, hydrated lime, limestone dust, Portland cement, silica, alum, fly ash, or mixtures thereof. Fillers such as mineral fillers and carbon black can be included in an amount of up to 5 parts by weight or up to 2 parts by weight.

The asphalt compositions can also include an aggregate. The aggregate can be of varying sizes as would be understood by those of skill in the art. Any aggregate that is traditionally employed in the production of bituminous paving compositions can be used, including dense-graded aggregate, gap-graded aggregate, open-graded aggregate, reclaimed asphalt pavement, and mixtures thereof. In some embodiments, the asphalt composition can include an aggregate in an amount of 1% to 90% by weight, based on the weight of the asphalt composition. In some embodiments, the asphalt composition can include an aggregate in an amount of 90% or less, 85% or less, 80% or less, 75% or less, 70% or less, 65% or less, 60% or less, 55% or less, 50% or less, or 45% or less by weight, based on the weight of the asphalt formulation. In some embodiments, the asphalt composition can include an aggregate in an amount of 5% or greater, 10% or greater, 15% or greater, 20% or greater, 25% or greater, 30% or greater, 35% or greater, 40% or greater, 45% or greater, or 50% or greater by weight, based on the weight of the asphalt composition.

In some embodiments, the asphalt composition can have a pH of 7 or less. For example, the asphalt composition can have a pH of 6.5 or less, 6 or less, 5.5 or less, 5 or less, 4.5 or less, 4 or less, 3.5 or less, 3 or less, or 2.5 or less. In some examples, the asphalt composition can have a pH of 1.5 or greater, 2 or greater, 2.5 or greater, 3 or greater, 3.5 or greater, 4 or greater, 4.5 or greater, 5 or greater, 5.5 or greater, 6 or greater, 6.5 or greater, or 7 or greater. In some embodiments, the asphalt composition can have a pH of from 1.5 to 7, from 2 to 6.5, from 1.5 to 6, from 2 to 6, from 3 to 7, from 3 to 6.5, from 3 to 6, from 4 to 7, from 4 to 6.5, or from 4 to 6.

Methods

Methods for preparing the asphalt compositions described herein are also provided. First, the copolymer can be prepared by polymerizing the monomers using free-radical emulsion polymerization. The monomers for the copolymer can be prepared as aqueous dispersions at a suitable temperature. The polymerization can be carried out at low temperature (i.e., cold polymerization) or at high temperature method (i.e., hot polymerization). In some embodiments, polymerization can be carried out at low temperature such as 30° C. or less (for example from 2° C. to 30° C., 2° C. to 25° C., 5° C. to 30° C., or 5° C. to 25° C.). In some embodiments, polymerization can be carried out at high temperature such as from 40° C. or greater, 50° C. or greater, or 60° C. or greater. In some embodiments, the high temperature can be from 40° C. to 100° C., 40° C. to 95° C., or 50° C. to 90° C. Generally, the emulsion polymerization temperature is from 10° C. to 95° C., from 30° C. to 95° C., or from 75° C. to 90° C.

The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

The copolymer can be produced by single stage polymerization or multiple stage polymerization.

One or more surfactants can be included in the aqueous dispersions to improve certain properties of the dispersions, including particle stability. For example, oleic acid, sodium laureth sulfate, and alkylbenzene sulfonic acid or sulfonate surfactants could be used. Examples of commercially available surfactants include Calfoam® ES-303, a sodium laureth sulfate, and Calfax® DB-45, a sodium dodecyl diphenyl oxide disulfonate, both available from Pilot Chemical Company (Cincinnati, OH). In general, the amount of surfactants employed can be from 0.01 to 5%, based on the total amount of the monomers to be polymerized.

The polymerization reaction can be conducted in the presence of molecular weight regulators to reduce the molecular weight of the copolymer or other additives such as dispersants, stabilizers, chain transfer agents, buffering agents, salts, preservatives, fire retardants, wetting agents, protective colloids, biocides, crosslinking promoters, antioxidants, antiozonants, prevulcanization inhibitors, and lubricants. In some embodiments, the additives can be added to the latex composition after the polymerization reaction. The latex composition can be agglomerated, e.g., using chemical, freeze or pressure agglomeration, and water removed to produce the desired solids content. In some embodiments, the solids content is 55% or greater, 60% or greater, or 65% or greater.

In some embodiments, small amounts (e.g., from 0.01 to 2% by weight based on the total monomer weight) of molecular weight regulators, such as a mercaptan, can optionally be used. Such substances are preferably added to the polymerization zone in a mixture with the monomers to be polymerized and are considered part of the total amount of unsaturated monomers used in the copolymers.

In the case of copolymers derived from styrene and butadiene, the copolymer can be produced by high temperature polymerization (e.g., polymerization at a temperature of 40° C. or greater, such as at a temperature of from 40° C. to 100° C.) or by low temperature polymerization (e.g., polymerization at a temperature of less than 40° C., such as at a temperature of from 5° C. to 25° C.). As such, copolymers derived from styrene and butadiene can include varying ratios of cis-1,4 butadiene units to trans-1,4 butadiene units.

As described above, copolymers derived from styrene and butadiene can be polymerized in a continuous, semi-batch or batch process. Once the desired level of conversion is reached, the polymerization reaction can be terminated by the addition of a shortstop to the reactor. The shortstop reacts rapidly with free radicals and oxidizing agents, thus destroying any remaining initiator and polymer free radicals and preventing the formation of new free radicals. Exemplary shortstops include organic compounds possessing a quinonoid structure (e.g., quinone) and organic compounds that may be oxidized to a quinonoid structure (e.g., hydroquinone), optionally combined with water soluble sulfides such as hydrogen sulfide, ammonium sulfide, or sulfides or hydrosulfides of alkali or alkaline earth metals; N-substituted dithiocarbamates; reaction products of alkylene polyamines with sulfur, containing presumably sulfides, disulfides, polysulfides and/or mixtures of these and other compounds; dialkylhydroxylamines; N,N'-dialkyl-N,N'-methylenebishydroxylamines; dinitrochlorobenzene; dihydroxydiphenyl sulfide; dinitrophenylbenzothiazyl sulfide; and mixtures thereof. In the case of high temperature polymerizations, polymerization can be allowed to continue until complete monomer conversion, i.e., greater than 99%, in which case a shortstop may not be employed.

Once polymerization is terminated (in either the continuous, semi-batch or batch process), the unreacted monomers can be removed from the copolymer dispersion. For example, butadiene monomers can be removed by flash distillation at atmospheric pressure and then at reduced pressure. Styrene monomers can be removed by steam stripping in a column.

If desired, copolymers derived from styrene and butadiene can be agglomerated, e.g., using chemical, freeze or pressure agglomeration, and water removed to produce a solids content of greater than 50% to 75%.

An antioxidant can be added to polymers derived from styrene and butadiene to prevent oxidation of the double bonds of the polymer, and can either be added before or after vulcanization of the polymer. The antioxidants can be, for example, substituted phenols or secondary aromatic amines. Antiozonants can also be added to polymers derived from styrene and butadiene to prevent ozone present in the atmosphere from cracking the polymer by cleaving the double bonds in the polymer. Prevulcanization inhibitors can also be added to polymers derived from styrene and butadiene to prevent premature vulcanization or scorching of the polymer.

If desired, polymers derived from styrene and butadiene can be vulcanized or cured to crosslink the polymer thereby increasing the tensile strength and elongation of the rubber by heating the polymer, typically in the presence of vulcanizing agents, vulcanization accelerators, antireversion agents, and optionally crosslinking agents. Exemplary vulcanizing agents are described herein. The vulcanizing agent can be present from 0.1 to 15%, from 0.3 to 10%, or from 0.5 to 5%, by weight based on the weight of the polymer. The vulcanization accelerator can be present within a range of from 0.1 to 15%, from 0.3 to 10%, or from 0.5 to 5%, by weight based on the weight of the polymer. Antireversion agents can also be included in an amount of from 0 to 5%, from 0.1 to 3%, or from 0.1 to 2% by weight based on the weight of the polymer.

In some embodiments, the copolymer can be dispersed in an aqueous medium to form an aqueous dispersion. The aqueous dispersion can further include an aggregate, a filler, a pigment, a dispersing agent, a thickener, a defoamer, a surfactant, a biocide, a coalescing agent, a flame retardant, a stabilizer, a curing agent, a flow agent, a leveling agent, a hardener, or a combination thereof.

Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. Defoamers serve to minimize frothing during mixing. Suitable defoamers include organic defoamers such as mineral oils, silicone oils, and silica-based defoamers. Exemplary silicone oils include polysiloxanes, polydimethylsiloxanes, polyether modified polysiloxanes, and combinations thereof. Exemplary defoamers include BYK®-035, available from BYK USA Inc., the TEGO® series of defoamers, available from Evonik Industries, the DREWPLUS® series of defoamers, available from Ashland Inc., and FOAMASTER® NXZ, available from BASF Corporation.

Other suitable additives that can optionally be incorporated into the latex composition includes coalescing agents (coalescents), pH modifying agents, biocides, co-solvents and plasticizers, crosslinking agents (e.g., quick-setting additives, for example, a polyamine such as polyethyleneimine), dispersing agents, rheology modifiers, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleanability additives, flatting agents, humectants, insecticides, lubricants, odorants, oils, waxes and slip aids, soil repellants, stain resisting agents, and combinations thereof.

Suitable coalescents, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, and combinations thereof.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof. Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include biocides that inhibit the growth of mold, mildew, and spores thereof in the coating. Examples of mildewcides include 2-(thiocyanomethylthio)benzothiazole, 3-iodo-2-propynyl butyl carbamate, 2,4,5,6-tetrachloroisophthalonitrile, 2-(4-thiazolyl)benzimidazole, 2-N-octyl4-isothiazolin-3-one, diiodomethyl p-tolyl sulfone, as well as acceptable salts and combinations thereof. In certain embodiments, the coating composition contains 1,2-benzisothiazolin-3-one or a salt thereof. Biocides of this type include PROXEL® BD20, commercially available from Arch Chemicals, Inc. The biocide can alternatively be applied as a film to the coating and a commercially available film-forming biocide is Zinc Omadine® commercially available from Arch Chemicals, Inc. Exemplary crosslinking agents include dihydrazides (e.g., dihydrazides of adipic acid, succinic acid, oxalic acid, glutamic acid, or sebastic acid). The dihydrazides can be used, for example, to crosslink diacetone acrylamide or other crosslinkable monomers.

The latex composition can have an overall anionic charge, non-ionic, or cationic charge. One of ordinary skill in the art understands that the overall charge of the latex composition can be influenced by the surfactant used, the particular monomers used to form the polymer in the latex composition, and the pH of the latex composition. The charge of an anionic latex composition or a non-ionic latex composition can be "flipped" (modified) to an overall cationic charge, thereby forming a cationic latex composition. In some embodiments, the cationic latex composition can be formed by mixing the latex composition with an inorganic acid.

Suitable surfactants include nonionic surfactants and anionic surfactants. Examples of nonionic surfactants are alkylphenoxy polyethoxyethanols having alkyl groups of about 7 to about 18 carbon atoms, and having from about 6 to about 60 oxyethylene units; ethylene oxide derivatives of long chain carboxylic acids; analogous ethylene oxide condensates of long chain alcohols, and combinations thereof. Exemplary anionic surfactants include ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and combinations thereof. In certain embodiments, the composition comprises a nonionic alkylpolyethylene glycol surfactant, such as LUTENSOL® TDA 8 or LUTENSOL® AT-18, commercially available from BASF SE. In certain embodiments, the composition comprises an anionic alkyl ether sulfate surfactant, such as DISPONIL® FES 77, commercially available from BASF SE. In certain embodiments, the composition comprises an anionic diphenyl oxide disulfonate surfactant, such as CALFAX® DB-45, commercially available from Pilot Chemical.

The latex compositions can be used in asphalt compositions prepared at an elevated temperature, for example, from 160° C. to 200° C. (hot-mix asphalt), from 120° C. to 160° C. (warm-mix asphalt), or at temperatures below 120° C. (e.g., from 5° C. to less than 100° C., from 10° C. to 90° C., or from 20° C. to 85° C.). In some embodiments, the latex compositions can be used in asphalt emulsions prepared at less than 100° C., e.g., at ambient temperature, to produce a polymer-modified asphalt emulsion.

The method of preparing the asphalt emulsions can include contacting asphalt with a latex composition as described herein and a polyalkyleneimine. The particular components, including the asphalt, the latex composition, the polyalkyleneimine, and the optional photoinitiator in the asphalt emulsions can be mixed together by any means known in the art. The particular components can be mixed together in any order.

In some embodiments, the latex composition and the polyalkyleneimine are mixed with the asphalt simultaneously. For example, the latex composition can include the polyalkyleneimine such that the polyalkyleneimine and copolymer are simultaneously mixed with the asphalt. Specifically, the method of making the asphalt composition can include adding a base disclosed herein, such as ammonia, to the latex composition to raise the pH of the latex composition to greater than 8. The polyalkyleneimine is then added to the basic latex composition to form a blend. The blend of latex composition and polyalkyleneimine is then post-added to the anionic asphalt emulsion. Alternatively, the latex composition comprising the polyalkyleneimine can be contacted with the asphalt such as in a colloid mill to form an anionic asphalt emulsion. For example, the latex composition and the asphalt can be fed into a colloid mill at a temperature of less than 100° C. (e.g., 40° C. to 95° C.) with high shear mixing to produce an asphalt composition (such as an asphalt emulsion) having asphalt droplets dispersed in the water. Optionally, the method can further include decreasing the pH of the asphalt composition after mixing the latex and polyalkyleneimine with asphalt to facilitate crosslinking of the carboxylated groups in the copolymer with the polyalkyleneimine. For example, if an anionic surfactant is used to produce an anionic polymer-modified asphalt emulsion, an acidic pH modifying agent can be added to the asphalt emulsion during pavement application to decrease the pH of the asphalt emulsion to less than 8, such as less than 7, less than 6, less than 5, less than 4, less than 3, or less than 2. A photoinitiator, such as benzophenone or a derivative thereof, can be added to the composition at any stage of preparation. For example, the photoinitiator can be added to the latex composition prior to, during, or after addition of the polyalkyleneimine Alternately, the photoinitiator can be added to the asphalt prior to, during, or after addition of the latex composition.

In other embodiments, the polyalkyleneimine can be combined directly with the asphalt prior to mixing with the latex composition. For example, the method of preparing the asphalt compositions can include preparing a cationic or an anionic asphalt emulsion. The cationic or anionic asphalt emulsion can be prepared by feeding asphalt, water, and a suitable surfactant into a colloid mill at a temperature of less than 100° C. (e.g., 60° C. to 95° C.) with high shear mixing to produce asphalt droplets dispersed in the water (asphalt emulsion). The polyalkyleneimine can be added to the asphalt prior to, during, or after mixing with water. The latex dispersion can be contacted with the asphalt emulsion comprising the polyalkyleneimine, for example, in a colloid mill to form a polymer-modified asphalt composition. Optionally, a pH modifying agent can be added to the asphalt composition after mixing with the latex composition to decrease the pH to less than 8, such as less than 7, less than 6, less than 5, less than 4, less than 3, or less than 2. As noted herein, a photoinitiator can be added to the composition at any stage of preparation.

In still other embodiments, the polyalkyleneimine can be post-added to the unmodified asphalt emulsion or to the modified emulsion comprising the latex composition. For example, the method of preparing the asphalt compositions can include preparing an asphalt emulsion by feeding asphalt, water, a latex composition, and a suitable surfactant into a colloid mill at a temperature of less than 100° C. (e.g., 40° C. to 95° C.) with high shear mixing to produce a polymer-modified asphalt emulsion. The polyalkyleneimine can be contacted with the polymer-modified asphalt emulsion comprising the latex composition, such as in a colloid mill to form the asphalt composition. Optionally, a pH modifying agent can be added to the latex modified asphalt composition after mixing with the polyalkyleneimine to decrease the pH to less than 8, such as less than 7, less than 6, less than 5, less than 4, less than 3, or less than 2. The photoinitiator can be added to the asphalt composition at any stage of preparation.

In some embodiments, an additional cationic latex composition can be used. The cationic latex composition and the asphalt emulsion are not mixed prior to applying to a surface. For example, during pavement application, the cationic latex can be applied to the pavement first followed by a modified asphalt emulsion (comprising an anionic latex, a polyalkyleneimine, and asphalt prepared using a method as described herein). Alternatively, the modified asphalt emulsion can be applied to the pavement followed by the cationic latex.

The asphalt compositions described herein can have a viscosity of 100 cp or greater, such as 150 cp or greater, 200 cp or greater, 250 cp or greater, 300 cp or greater, 350 cp or greater, 400 cp or greater, 450 cp or greater, 500 cp or greater, 600 cp or greater, 700 cp or greater, 800 cp or greater, 900 cp or greater, 1000 cp or greater, 1500 cp or greater, 2000 cp or greater, or 2500 cp or greater, at 60° C. as determined using a Brookfield viscometer, spindle #3 at 20 rpm. In some embodiments, the asphalt compositions can have a viscosity of 2500 cp or less, 2000 cp or less, 1500 cp or less, 1250 cp or less, 1000 cp or less, 950 cp or less, 900 cp or less, 850 cp or less, 800 cp or less, 750 cp or less, 700 cp or less, 650 cp or less, 600 cp or less, 550 cp or less, 500 cp or less, 400 cp or less, 250 cp or greater, 300 cp or less, or 200 cp or less, at 60° C. as determined using a Brookfield viscometer, spindle #3 at 20 rpm. In some embodiments, the viscosity of the asphalt compositions can be from 100 cp to 2500 cp, for example, 100 cp to 1500 cp, 100 cp to 1000 cp, 100 cp to 800 cp, 100 cp to 600 cp, 100 cp to 500 cp, 200 cp to 1500 cp, 200 cp to 1000 cp, 200 cp to 800 cp, 200 cp to 600 cp, 200 cp to 500 cp, 100 cp to 500 cp, 100 cp to 450 cp, or 150 cp to 500 cp, at 60° C. as determined using a Brookfield viscometer, spindle #3 at 20 rpm.

The asphalt compositions (such as the asphalt emulsions) described herein can adhere to the standards of ASTM D977, ASTM D2397, AASHTO M140, and AASHTO M208.

The asphalt composition can be used to prepare hot mix asphalt compositions. A hot mix asphalt can be prepared, for example, by blending asphalt, a polyalkyleneimine, and a copolymer as described herein at a blending temperature exceeding the boiling point of water. In some embodiments, the asphalt composition can have a pH of 7 or less as described herein. The blending temperature can be 150° C. or greater or 160° C. or greater and 200° C. or less. The hot mix asphalt composition is substantially free of water and can have, for example, a viscosity of 3000 cp or less, 2500 cp or less, 2000 cp or less, or 1500 cp or less at 135° C., at 60° C. as determined using a Brookfield viscometer, spindle #3 at 20 rpm. In some embodiments, the hot-mix asphalt composition can have a viscosity of 1000 cp or greater, 1250 cp or greater, 1500 cp or greater, 2000 cp or greater, or 2500 cp or greater, at 60° C. as determined using a Brookfield viscometer, spindle #3 at 20 rpm. In some embodiments, the viscosity of the hot-mix asphalt composition can be from 1000 cp to 3000 cp, for example, 1000 cp to 2500 cp, 1000 cp to 2000 cp, 1500 cp to 2500 cp, or 1500 cp to 2000 cp, at 60° C. as determined using a Brookfield viscometer, spindle #3 at 20 rpm. The copolymer and polyalkyleneimine can be in the amounts described above when added to the hot mix asphalt, but the resulting hot mix asphalt will include less of the latex composition because the water is evaporated leaving the latex polymer and any other non-volatile additives.

The asphalt compositions comprising a copolymer, polyalkyleneimine, and optionally a photoinitiator as described herein can exhibit decreased drying times compared to an asphalt composition without the copolymer, polyalkyleneimine, and optional photoinitiator. Without wishing to be bound by any theory, it is believed that polyalkyleneimine crosslinks the carboxylated groups of the copolymer at low pH, for example, below 7 when water evaporates from the asphalt composition. Because of the destabilization brought about by the polyalkyleneimine, the emulsion breaks and sets earlier, resulting in faster drying and binder cohesion development and adhesion to aggregates and the underlying surface.

Methods of using the asphalt compositions described herein are disclosed. The asphalt compositions can be applied to a surface to be treated, restored, or sealed. Prior to application of the asphalt composition, the surface to be treated is usually cleaned to remove excess surface dirt, weeds, and contaminants by, for example, brushing the surface, blasting the surface with compressed air, or washing the surface. The asphalt compositions can be applied using any suitable method for applying a liquid to a porous surface, such as brushing, wiping and drawing, or spraying.

In some embodiments, the asphalt compositions, once applied, wet the surface thereby forming a layer on at least a portion and typically at least a substantial portion (e.g. more than 50%) of the surface. In some embodiments, when asphalt emulsions are applied to a surface, water loss occurs in the emulsion, primarily due to adsorption of the water. The water also delivers the asphalt and the latex composition to the surface. In some embodiments, the asphalt emulsion penetrates and adheres to the surface it is applied to, cures in a reasonably rapid time, and provides a water-tight and air-tight barrier on the surface. The asphalt emulsion layer also promotes adhesion between the older surface and the later applied surface treatment layer. It is desirable for the asphalt formulations to be easily applied and have an adequate shelf life.

An aggregate can be blended into the asphalt composition before application to a surface. In some embodiments, the aggregate can be applied to the asphalt composition after it is applied to a surface. For example, sand can be applied to the asphalt composition after it is applied to a surface, for example, if the composition is to be used as a tack coat, to reduce the tackiness of the surface. The asphalt composition and optionally the aggregate can be compacted after application to the surface as would be understood by those of skill in the art.

The asphalt compositions can be applied for use in a pavement or paved surface. A pavement surface or a paved surface is a hard surface that can bear pedestrian or vehicular travel can include surfaces such as motorways/roads, parking lots, bridges/overpasses, runways, driveways, vehicular paths, running paths, walkways, and the like. The asphalt compositions can be applied directly to an existing paved surface or can be applied to an unpaved surface. In some embodiments, the asphalt compositions can be applied to an existing paved layer as a tie layer, and a new layer comprising asphalt such as a hot mix layer is applied to the tie layer. The asphalt compositions can be applied to a surface "cold," i.e., at a temperature below 40° C., or can be applied to at an elevated temperature, for example, from 50° C. to 120° C., from 55° C. to 100° C., or from 60° C. to 80° C.

In some embodiments, the asphalt compositions can be used as a tack coat or coating. The tack coat is a very light spray application of diluted asphalt emulsion that can be used to promote a bond between an existing surface and the new asphalt application. The tack coat acts to provide a degree of adhesion or bonding between asphalt layers, and in some instances, can fuse the layers together. The tack coat also acts to reduce slippage and sliding of the layers relative to other layers in the pavement structure during use or due to wear and weathering of the pavement structure. In some embodiments, the asphalt compositions can be applied to an existing paved layer (such as a hot-mix layer) as a tack coat, and a new layer comprising asphalt such as a hot-mix layer can be applied to the tack coat. As would be understood by those skilled in the art, the tack coat typically does not include aggregate, although sand may be applied to the tack coat after application as mentioned herein.

The tack coat compositions have been shown to be low-tracking or "trackless" coatings and meet an ASTM-D-977 standard. In particular, the asphalt compositions cure/ dry quickly. For example, where the asphalt compositions are used as a tack coating, the coating cures quickly such that a pavement layer may be applied to the coating, soon after the asphalt composition is applied to the substrate. In some embodiments, the applied asphalt composition can become trackless (tack-free) in less than 10 minutes, such as less than 9 minutes, less than 8 minutes, less than 7 minutes, less than 6 minutes, less than 5 minutes, less than 4 minutes, or less than 3 minutes. In some embodiments, the applied asphalt composition can cure in 15 minutes to 45 minutes, and may cure as rapidly as less than 1 minute to 10 minutes after the composition is applied to the exposed surface. The cure rate will depend on the application rate, the dilution ratios used, the base course conditions, the weather, and other similar considerations. If the prepared pavement surface or base course contains excess moisture, the curing time of the asphalt compositions may be increased.

Methods for applying tack coats comprising the asphalt compositions can include applying the tack coat to a surface, wherein the tack coat is at a temperature of from ambient temperature to 130° C., such as from 20° C. to 130° C., from 60° C. to 130° C., or from ambient temperature to 100° C. The applying step can be carried out using a brush, a squeegee, or spray equipment. The surface can be selected from dirt, gravel, slurry seal pavement, chip seal pavement, hot mix asphalt, warm mix asphalt, microsurfaced pavements, and concrete pavements. The methods disclosed herein can further include applying an asphalt composition to the tack coat once the tack coat has become trackless.

In some embodiments, the asphalt compositions can also be used as a fog seal. A fog seal is a surface treatment that applies a light application of the composition to an existing paved surface such as a parking lot to provide an enriched pavement surface that looks fresh and black. In some embodiments, the fog seal would include a filler such as carbon black to blacken the composition. As would be understood by those skilled in the art, the fog seal might not include aggregate. The fog seal compositions, like the bond coat compositions, have also been shown to be low-tracking or "trackless" coatings.

In some embodiments, the asphalt compositions can be used as a chip seal composition. Chip seals are the most common surface treatment for low-volume roads. The chip seal composition can be applied to a surface followed by the application of aggregate. In some embodiments, the asphalt compositions can be used in a microsurfacing application. Microsurfacing is designed for quick traffic return with the capacity of handling high traffic volume roadways. For the microsurfacing composition, aggregate can be mixed in with the cationic asphalt composition before application to a surface.

By way of non-limiting illustration, examples of certain embodiments of the present disclosure are given below.

EXAMPLES

Example 1

Surface Crosslinking Asphalt

The styrene-butadiene latexes as described in Table 1 were mixed with a polyethyleneimine and optionally a benzophenone photoinitiator. The latex containing the polyethyleneimine was added to a "soap" solution containing an anionic surfactant (INDULIN® 201 or PC-1542) and a base to form a soap latex blend having a pH of 10 to 11. The soap latex blend and molten asphalt (such as AXEON 64-22) were pumped into a colloid mill where high shear mixing produced an asphalt emulsion. Also, in some cases, the latex composition was post-added to an unmodified anionic asphalt emulsion based on AXEON 64-22 asphalt. The amounts of each ingredient are given in Table 1. The polymer amounts are based on asphalt solids and the other components are based on latex polymer solids. The asphalt emulsion compositions were applied to a substrate at ambient temperature and the time for the asphalt composition to become trackless was determined. The results are summarized in Table 1.

TABLE 1

Asphalt emulsion compositions.

| ID | BD (wt %) | S (wt %) | IA (wt %) | BA (wt %) | NMA (wt %) | AM (wt %) | Latex (wt %) | QT (wt %) | #PI (wt %) | ⁺Time (min) | PG Grade | ˆSoap-type/Amt (wt %) |
|---|---|---|---|---|---|---|---|---|---|---|---|---|
| A | 54.5 | 42.42 | 2.7 | 0 | 0.38 | 0 | 3 | 0.64 | 0 | <5 | Axeon 64-22 | a/0.5 |
| B | 54.5 | 42.42 | 2.7 | 0 | 0.38 | 0 | 3 | 0.64 | 0 | <5 | Axeon 64-22 | a/0.5 |
| C | 54.5 | 42.42 | 2.7 | 0 | 0.38 | 0 | 3 | 0 | 0.24 | >5 | Axeon 64-22 | a/0.5 |
| D | 54.5 | 42.42 | 2.7 | 0 | 0.38 | 0 | 3 | 0.64 | 0.5 | <3 | Axeon 64-22 | a/0.5 |
| E | 54.5 | 42.42 | 2.7 | 0 | 0.38 | 0 | 3 | 0.64 | 0 | ~10 | MAP 58-28 | a/0.5 |
| F | 54.5 | 42.42 | 2.7 | 0 | 0.38 | 0 | 3 | 0.64 | 0.5 | ~5 | MAP 58-28 | a/0.5 |
| G | 0 | 62.5 | 0 | 35 | 0 | 2.5 | 5 | 0 | 0 | >30 | Axeon 64-22 | b/3.5 |
| H | 0 | 62.5 | 0 | 35 | 0 | 2.5 | 5 | 0.64 | 0 | >30 | Axeon 64-22 | b/3.5 |
| I | 0.0 | 62.5 | 0 | 35 | 0 | 2.5 | 5 | 0 | 0 | >20 | Axeon 64-22 | b/3.5 |
| J | 0 | 62.5 | 0 | 35 | 0 | 2.5 | 5 | 0 | 0 | >30 | Axeon 64-22 | b/3.5 |

S - styrene; BD - butadiene; IA - itaconic acid, BA - butyl acrylate, NMA - N - methylolacrylamide, AM - acrylamide, QT - polyethyleneimine; PI - photoinitiator; RT - room temperature. The weight percentages for the QT and PI is the parts by weight of additive (i.e., QT, or PI) per 100 parts by weight latex solids.
Omnirad 81 photoinitiator.
⁺Time (min) - refers to the time for the coatings to become trackless.
ˆSoap-type/Amt (wt %) - refers to the type of soap used to make the asphalt emulsion and "a" refers to INDULIN 201 and "b" refers to INDULIN SAL. The soap weight percentage is based on the parts by weight of soap based on the parts by weight of the asphalt emulsion.

Results and discussion: Addition of polyethyleneimine and optionally a benzophenone photoinitiator to the coatings showed improvement in tracking.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. An asphalt composition comprising:
    a) asphalt,
    b) a carboxylated copolymer derived from one or more carboxylic acid monomers and one or more ethylenically unsaturated monomers selected from the group consisting of styrene, butadiene, meth(acrylate) monomers, vinyl acetate, vinyl ester monomers, and combinations thereof,
    c) a polyalkyleneimine present in an amount of greater than 0% to up to 10% by weight of the asphalt composition; and
    d) a photoinitiator.

2. A method of producing an asphalt composition, comprising:
    mixing asphalt; a carboxylated copolymer derived from one or more carboxylic acid monomers and one or more ethylenically unsaturated monomers selected from the group consisting of styrene, butadiene, meth(acrylate) monomers, vinyl acetate, vinyl ester monomers, and combinations thereof; a polyalkyleneimine; and a photoinitiator at a pH of 7 or greater.

3. A tack coat for bonding asphalt layers, comprising:
    a) asphalt,
    b) a carboxylated styrene-butadiene copolymer,
    c) a polyalkyleneimine present in an amount of greater than 0% to up to 10% by weight of the asphalt composition, and
    d) a benzophenone-containing photoinitiator,
    wherein the tack coat becomes trackless in less than 10 minutes and wherein the tack coat meets an ASTM-D-977 standard.

* * * * *